US008386452B2

(12) United States Patent
Ochi et al.

(10) Patent No.: US 8,386,452 B2
(45) Date of Patent: Feb. 26, 2013

(54) DATA COMBINATION SYSTEM AND DATA COMBINATION METHOD

(75) Inventors: Daisuke Ochi, Yokosuka (JP); Ichiro Okajima, Yokosuka (JP); Hiroshi Kawakami, Yokosuka (JP); Toshihiro Suzuki, Yokohama (JP); Manhee Jo, Yokohama (JP); Tomohiro Nagata, Ota-ku (JP); Motonari Kobayashi, Yokohama (JP); Yuki Oyabu, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/321,383

(22) PCT Filed: May 10, 2010

(86) PCT No.: PCT/JP2010/057893
§ 371 (c)(1),
(2), (4) Date: Nov. 18, 2011

(87) PCT Pub. No.: WO2010/134440
PCT Pub. Date: Nov. 25, 2010

(65) Prior Publication Data
US 2012/0066207 A1    Mar. 15, 2012

(30) Foreign Application Priority Data
May 19, 2009    (JP) .................................. 2009-121126

(51) Int. Cl.
*G06F 17/30*    (2006.01)
(52) U.S. Cl. ...................................... 707/705; 707/714

(58) Field of Classification Search .................. 707/705, 707/714
See application file for complete search history.

(56) References Cited

U.S. PATENT DOCUMENTS
6,789,096 B2 * 9/2004 Sankaran et al. ..................... 1/1
6,850,947 B1 * 2/2005 Chung et al. .................. 707/600
(Continued)

FOREIGN PATENT DOCUMENTS
JP    11 250079    9/1999
JP    2002 288012    10/2002
(Continued)

OTHER PUBLICATIONS

International Search Report Issued Jun. 1, 2010 in PCT/JP10/057893 Filed May 10, 2010.
(Continued)

*Primary Examiner* — Thanh-Ha Dang
(74) *Attorney, Agent, or Firm* — Oblon, Spivak, McClelland, Maier & Neustadt, L.L.P.

(57) ABSTRACT

A data join system of the present invention includes a table determination unit 11 selecting a record b as a join target if a value of a key item included in a record a acquired by a data write unit from a table A falls within a first predetermined range set based on a value of a key item included in the record b stored in a table B, a data join unit joining the selected record b with the record a to generate a record c, and a data write unit storing the record c into a table C. Thus, the success rate of data join can be improved while the accuracy of join of the record b and the record a to be joined is improved.

9 Claims, 6 Drawing Sheets

U.S. PATENT DOCUMENTS 6,901,403 B1 * 5/2005 Bata et al. ............................ 1/1
2004/0098405 A1 * 5/2004 Zrubek et al. ............. 707/103 R

FOREIGN PATENT DOCUMENTS

| JP | 2005 049943 | 2/2005 |
| JP | 2008-310634 | 12/2008 |

OTHER PUBLICATIONS

International Preliminary Report on Patentability and Written Opinion issued Dec. 22, 2011 in Application No. PCT/JP2010/057893.
Office Action (with English translation) mailed on Nov. 6, 2012, in counterpart Japanese Appln No. P2011-514382 (3 pages).

* cited by examiner

| USER ID | DATE AND TIME | POSITION | A |
|---|---|---|---|
| 111 | 2008/8/17 | LAT:x1,LON:y1 | ~a1(a) |
| 222 | 2008/8/12 | LAT:x2,LON:y2 | ~a2(a) |
| 333 | 2008/8/10 | LAT:x3,LON:y3 | ~a3(a) |

(b)

| END OF JULY ATTRIBUTE INFORMATION (b7) | | | B1(B) |
|---|---|---|---|
| USER ID | GENDER | BIRTH DATE | |
| 111 | 1 | y1/m1/d1 | ~b11(b) |
| 222 | 2 | y2/m2/d2 | ~b12(b) |

(c)

| END OF AUGUST ATTRIBUTE INFORMATION (b8) | | | B2(B) |
|---|---|---|---|
| USER ID | GENDER | BIRTH DATE | |
| 222 | 2 | y2/m2/d2 | ~b21(b) |
| 333 | 1 | y3/m3/d3 | ~b22(b) |

Fig.4

| USER ID | DATE AND TIME | POSITION | GENDER | BIRTH DATE | JOINED TABLE | |
|---|---|---|---|---|---|---|
| 111 | 2008/8/17 | LAT:x1,LON:y1 | 1 | y1/m1/d1 | b7 | c1(c) |
| 222 | 2008/8/12 | LAT:x2,LON:y2 | 2 | y2/m2/d2 | b8 | c2(c) |
| 333 | 2008/8/10 | LAT:x3,LON:y3 | 1 | y3/m3/d3 | b8 | c3(c) |

DATA COMBINATION SYSTEM AND DATA COMBINATION METHOD

TECHNICAL FIELD

The present invention relates to a data join system and a data join method.

BACKGROUND ART

In general, in the process of joining a plurality of data with each other, attention is given to a predetermined item included in each data, and when the values of the item agree, the process of joining those data is performed. For example, a data processing apparatus is known in which content data included in a first table is joined with record data included in a second table if the respective attribute values and item values included in these data agree (for example, see Patent Literature 1).

CITATION LIST

Patent Literature
  Patent Literature 1: Japanese Patent Application Laid-Open Publication No. 2005-49943

SUMMARY OF INVENTION

Technical Problem

In a data join process of extracting data (hereinafter referred to as "join target data") in which a value of a predetermined item agrees with that of data (hereafter referred to as "join source data") included in one data group, from another data group, and joining the join source data with the extracted join target data, a plurality of join target data each in which a value of a predetermined item agrees may exist in the join target data group. Furthermore, there may be even more than one join target data group. In such cases, when only the agreement between values of a predetermined item is used as a basis of join, the join target data to be joined with the join source data cannot be determined. Furthermore, to determine join target data, any other items different from the predetermined item that can involve a concept of range for values may be considered. Generally, it is necessary to improve the success rate of join in a data join process. However, it is not preferable to join such data in that the values of any other items are significantly different between join source data and join target data, because the accuracy of join of the joined join source data and join target data is deteriorated.

The present invention is therefore made in view of the foregoing problem and aims to provide a data join system and a data join method in which the accuracy of join of data to be joined can be improved while the success rate of data join is improved, in a data join process.

Solution to Problem

In order to solve the problem above, a data join system of the present invention joins join source data including an identification item and a key item with selected join target data which is one of join target data selected from a join target data group having a plurality of join target data including an identification item and a key item. The data join system includes: join source data storage means for storing the join source data; join target data storage means for storing the join target data group; data determination means for selecting join target data as the selected join target data if a value of the identification item included in one of join source data stored in the join source data storage means agrees with a value of the identification item included in the join target data stored in the join target data storage means or falls within a predetermined identification range set based on the value of the identification item included in the join target data, and if a value of the key item included in the join source data falls within a first predetermined range set based on a value of the key item included in the join target data; data join means for joining the selected join target data selected by the data determination means with the join source data to generate composite data; composite data storage means for storing the composite data; and data write means for storing the composite data generated by the data join means into the composite data storage means. The predetermined identification range is a finite range including a value of the identification item included in the join target data. The first predetermined range is a finite range including a value of the key item included in the join target data.

In order to solve the problem above, a data join method of the present invention joins join source data including an identification item and a key item with selected join target data which is one of join target data selected from a join target data group having a plurality of join target data including an identification item and a key item. The data join method includes: a data determination step of selecting join target data as the selected join target data if a value of the identification item included in one of join source data agrees with a value of the identification item included in the join target data or falls within a predetermined identification range set based on the value of the identification item included in the join target data, and if a value of the key item included in the join source data falls within a first predetermined range set based on a value of the key item included in the join target data; a data join step of joining the selected join target data selected in the data determination step with the join source data to generate composite data; and a data write step of storing the composite data generated by the data join means into composite data storage means for storing the composite data. The predetermined identification range is a finite range including a value of the identification item included in the join target data. The first predetermined range is a finite range including a value of the key item included in the join target data.

In the data join system and the data join method of the present invention, when join source data is to be joined with join target data, if the identification item agrees or falls within a predetermined identification range set based on a value of the identification item included in the join target data, and in addition, if a value of the key item of the join source data falls within a first predetermined range set based on a value of the key item of the join target data, the join target data is joined as selected join target data with the join source data, thereby improving the accuracy of data join. It is noted that when the identification item is an item in which a value not having a concept of range is stored, the identification item is an item that stores, for example, an identifier of a user as a value. When the identification item is an item in which a value having a concept of range is stored, the identification item is an item that stores, for example, a network prefix of an identifier of an IP address as a value. The key item is an item in which a consecutive or discrete value can be assumed, and may involve the concept of range for that value.

In the data join system of the present invention, the data determination means extracts, as extracted join target data, join target data in which a value of the identification item included in the join target data agrees with a value of the identification item included in the join source data or a value of the identification item included in the join source data falls within a predetermined identification range set based on the value of the identification item included in the join target data, from a plurality of the join target data stored in the join target data storage means. If a value of the key item included in the join source data falls within the first predetermined range set based on a value of the key item included in the extracted join target data, the data determination means selects the extracted join target data as the selected join target data.

In this case, after the potential join target data to be joined with the join source data is extracted as extracted join target data based on the value of the identification item, if a value of the key item included in the join source data falls within the first predetermined range set based on a value of the key item of the extracted join target data, the extracted join target data is joined with the join source data. Therefore, the accuracy of data join can be further improved, and in addition, the processing load of selecting the selected join target data based on a value of the key item can be reduced.

In the data join system of the present invention, the join source data and the join target data include a plurality of key items. If values of a plurality of key items included in the join source data fall within the respective first predetermined ranges set based on values of a plurality of key items included in the extracted join target data, the data determination means selects the extracted join target data as the selected join target data.

In this configuration, even when the join source and join target data are data having a plurality of key items, the join target data is selected as the selected join data to be joined with the join source data if the key items of the join source data fall within the first predetermined ranges set for the key items in the join target data. Therefore, the success rate of data join can be improved while the accuracy of join of the selected join target data and the join source data to be joined is improved.

In the data join system of the present invention, if a value of the key item included in the join source data does not fall within the first predetermined range set based on a value of the key item included in the extracted join target data, the data determination means selects the extracted join target data as the selected join target data if the value of the key item included in the join source data falls within a second predetermined range set adjacent to the first predetermined range.

In this configuration, even when a value of the key item of the join source data does not fall within the first predetermined range for a value of the key item of any of the extracted join target data, if it falls within the second predetermined range set adjacent to the first predetermined range for the key item of any of the extracted join target data, the extracted join target data is selected as selected join target data to be joined with the join source data. Therefore, the success rate of data join can be improved. In other words, in these configurations, when the value of the key item of the join source data falls within the first predetermined range for the value of the key item of the join target data, or when there exists no such extracted join target data in that the value of the key item falls within the first predetermined range, if it falls within the second predetermined range, the join target data is selected as selected join target data to be joined with the join source data. This prevents the join process for the join source data from failing without selecting join target data serving as a join target.

In the data join system of the present invention, the join source data and the join target data include a plurality of key items. If values of a plurality of key items included in the join source data fall within the respective first predetermined ranges set based on values of a plurality of key items included in the extracted join target data or the respective second predetermined ranges set adjacent to the first predetermined ranges, the data determination means selects the extracted join target data as the selected join target data.

In this configuration, even when the join source and join target data are data having a plurality of key items, if each key item of the join source data falls within the first predetermined range set for each key item in the join target data or the second predetermined range set adjacent to the first predetermined range, the join target data is selected as the selected join data to be joined with the join source data. Therefore, the success rate of data join can be improved while the accuracy of join of the selected join target data and the join source data to be joined is maintained.

In the data join system of the present invention, the data determination means extracts, as extracted join target data, join target data in which a value of the key item included in the join source data falls within the first predetermined range, from a plurality of the join target data stored in the join target data storage means, and if a value of the identification item included in the extracted join target data agrees with a value of the identification item included in the join source data or if a value of the identification item included in the join source data falls within a predetermined identification range set based on the value of the identification item included in the extracted join target data, the data determination means selects the extracted join target data as the selected join target data.

In this case, the potential join target data to be joined with the join source data is extracted as the extracted join target data based on the value of the key item, and thereafter, of the extracted join target data, the one in which the value of the identification item agrees or the one in which the value of the identification item included in the join source data falls within a predetermined identification range set based on the value of the identification item included in the extracted join target data is joined with the join source data. Therefore, the accuracy of data join can be further improved.

In the data join system of the present invention, when a value of the identification item included in the extracted join target data does not agree with a value of the identification item included in the join source data and when a value of the identification item included in the join source data does not fall within a predetermined identification range set based on the value of the identification item included in the extracted join target data, the data determination means extracts again, as the extracted join target data, another join target data having such a value that sets a second predetermined range adjacent to the first predetermined range as the key item, from the join target data storage means, and selects, as selected join target data, the extracted join target data in which a value of the identification item agrees with a value of the identification item included in the join source data or falls within a predetermined identification range set based on the value of the identification item included in the extracted join target data, from the extracted join target data that is extracted again.

In this configuration, even when a value of the identification item of the join source data does not agree with a value of the identification item of any of the extracted join target data extracted based on the first predetermined range in the key item or does not fall within a predetermined identification range set based on a value of the identification item included in the extracted join target data, if there exists, in the extracted join target data that is extracted again in the key item based on the second predetermined range adjacent to the first predetermined range, extracted join target data in which a value of the identification item agrees with that of the join source data or falls within a predetermined identification range set based on a value of the identification item included in the extracted join target data, the extracted join target data is selected as the selected join target data to be joined with the join source data. Therefore, the success rate of data join can be further improved. In other words, in this configuration, if the join target data in which a value of the identification item of the join source data agrees or falls within a predetermined identification range set based on a value of the identification item included in the extracted join target data exists in the extracted join target data extracted based on the first predetermined range in the key item, or if it does not exist in the extracted join target data extracted based on the first predetermined range but exists in the extracted join target data extracted based on the second predetermined range, the extracted join target data is selected as the selected join target data to be joined with the join source data. This prevents the join process for the join source data from failing without selecting join target data serving as a join target.

In the data join system of the present invention, the key item is an item concerning a date and time, and the first predetermined range is a predetermined period including a date and time of a value of the key item. In this configuration, the join source data associated with a date and time can be joined with join target data associated with a predetermined range.

Advantageous Effects of Invention

In the data join system and the data join method of the present invention, when join source data is to be joined with join target data, if the identification item agrees or falls within a predetermined identification range set based on a value of the identification item included in the join target data, and in addition, if a value of a key item of the join source data falls within a first predetermined range set based on a value of the key item of the join target data, the join target data is joined as the selected join target data with the join source data, thereby improving the success rate of data join. Furthermore, the join accuracy can be improved since the first predetermined range is a range set based on the value of the key item of the join target data. Therefore, in a process of data join, the success rate of data join can be improved while the accuracy of joining data to be joined is improved.

REFERENCE SIGNS LIST

1 . . . server, 10 . . . user request acquisition unit, 11 . . . table determination unit, 12 . . . data read unit, 13 . . . data join unit, 14 . . . data write unit, 15 . . . user result output unit, 16 . . . table storage unit

DESCRIPTION OF EMBODIMENTS

A data join system according to an embodiment of the present invention will be described with reference to the figures. It is noted that the same parts are denoted with the same reference numerals, if possible, and a duplicated description will be omitted.

(First Embodiment)

Figure 1:
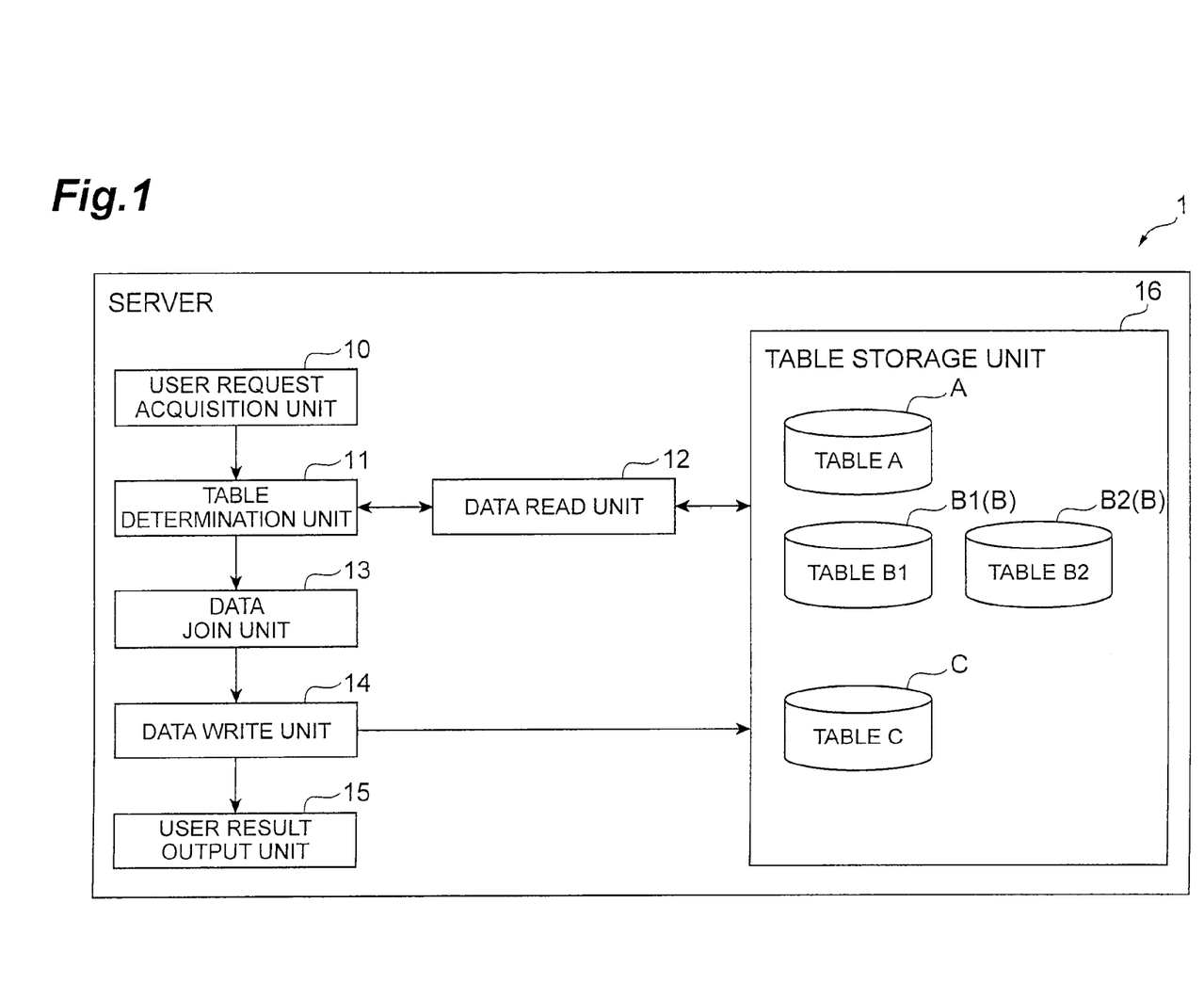
FIG. 1 is a functional block diagram of a server according to an embodiment of a data join system.

FIG. 1 is a block diagram showing a functional configuration of a server 1 according to an embodiment of the data join system. The server 1 is an apparatus which joins join source data including a plurality of key items with selected join target data selected from a join target data group having a plurality of join target data including a plurality of key items, and functionally includes a user request acquisition unit 10, a table determination unit 11 (data determination means), a data read unit 12, a data join unit 13 (data join means), a data write unit 14 (data write means), a user result output unit 15, and a table storage unit 16 (join source data storage means, join target data storage means, composite data storage means).

Figure 2:
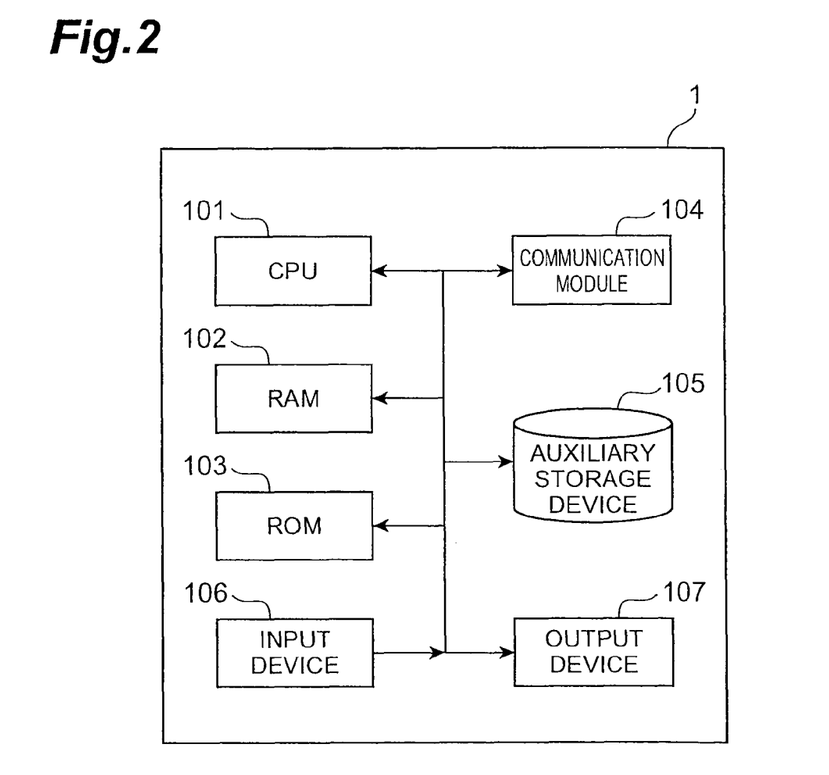
FIG. 2 is a hardware block diagram of the server.

FIG. 2 is a hardware configuration diagram of the server 1. As shown in FIG. 2, the server 1 is physically configured as a computer system mainly including a CPU 101, a RAM 102 and a ROM 103 serving as main storage units, an auxiliary storage device 105 such as a hard disk or a flash memory, an input device 106 such as a keyboard and a mouse serving as an input device, an output device 107 such as a display, and a communication module 104 serving as a data transmitting/receiving device such as a network card. Each function shown in FIG. 1 is implemented by loading predetermined computer software into hardware such as the CPU 101 or the RAM 102 to operate the communication module 104, the input device 106, and the output device 107 under the control of the CPU 101 and by performing data read and write in the RAM 102 or the auxiliary storage device 105.

Although the functional units 10 to 16 above are included in the server 1 in the present embodiment, they may be configured so as to be distributed among a plurality of servers that can communicate with each other via a network, and the data join system in the present invention may be configured with a plurality of servers.

First, prior to the description of the functional units 10 to 15, the tables stored in the table storage unit 16 will be described. The table storage unit 16 stores a table A, a table B1, a table B2, and a table C in the example shown in FIG. 1. The table B1 and the table B2 constitute a table B group. The table A stored in the table storage unit 16 corresponds to the join source data storage means in the present invention, and records a included in the table A correspond to join source data in the present invention. The tables B1 and B2 stored in the table storage unit 16 correspond to the join target data storage means in the present invention, a plurality of records b stored in the table B group correspond to a join target data group in the present invention, and records b included in the table B1 and the table B2 correspond to join target data in the present invention. The table C stored in the table storage unit 16 corresponds to composite data storage means for storing composite data as a record in the present invention.

Figure 3:
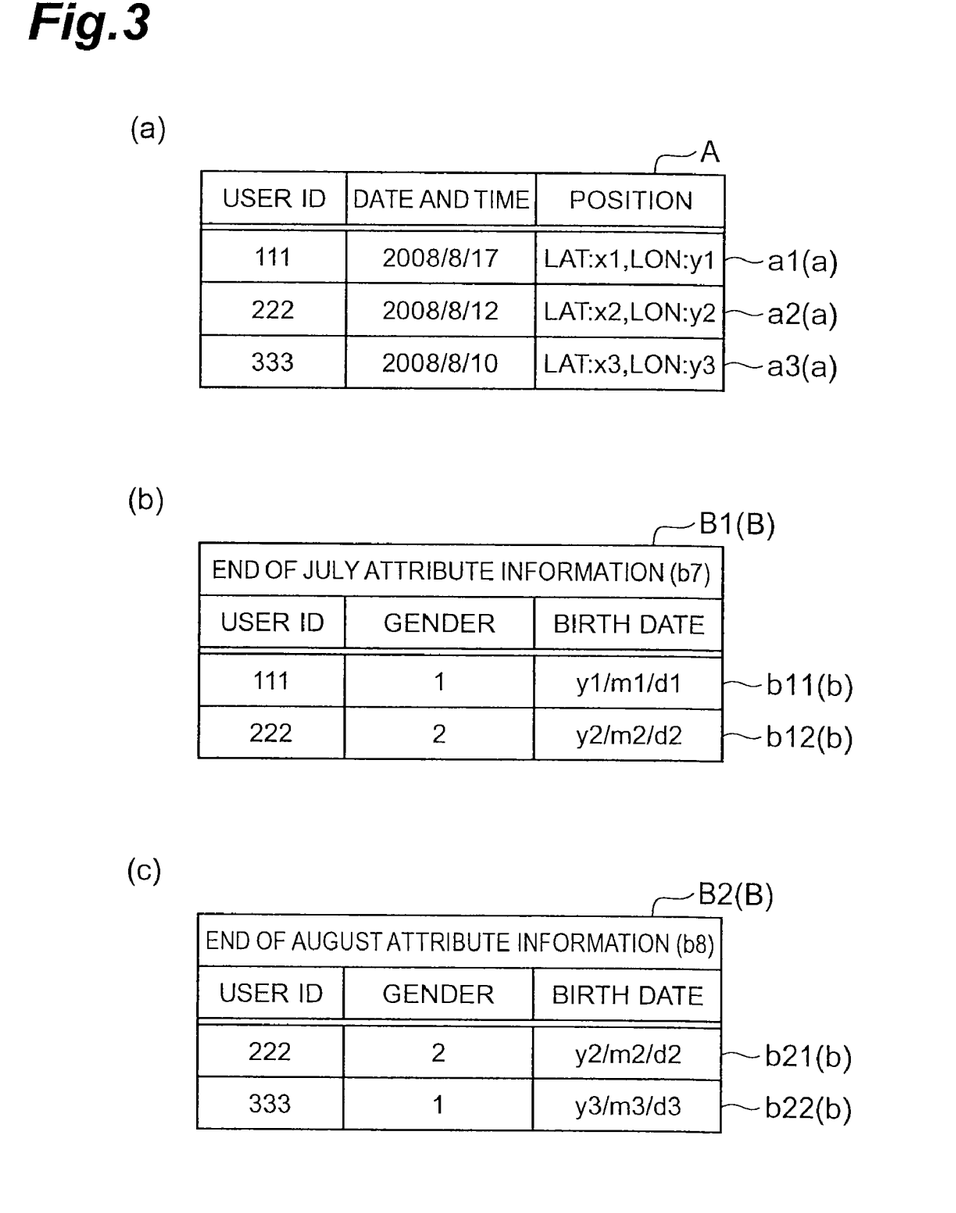
FIG. 3 is a diagram showing an example of configurations of a table A, and a table B1 and a table B2 stored in a table storage unit.

An example of the configuration of the table A is shown in FIG. 3(a). The table A is a table which stores positional information of a mobile terminal acquired by a base station and an exchange accommodating the mobile terminal, and has items "user ID", "date and time", and "position". The item "user ID" is an identifier of a user of a mobile terminal, the item "date and time" is a date on which the record is acquired, and the item "position" is information about the location of the mobile terminal. Then, the table A stores records a1, a2, and a3 in the example shown in FIG. 3(a).

An example of the configuration of the table B1 is shown in FIG. 3 (b). The table B1 is a table which stores attribute information of a subscriber of a mobile terminal as of the end of "July" in a provider of a mobile terminal communication service. The table B1 has items "user ID", "gender", and "birth date". The item "user ID" is an identifier of a user of a mobile terminal, the item "gender" is the gender of the user, and the item "birth date" is the birth date of the user. The table B1 also has the item "date and time" as to when the attribute information is acquired, and it is understood that the value of the item "date and time" is "July" in all the records b11 and b12.

An example of the configuration of the table B2 is shown in FIG. 3(c). The table B2 is a table which stores attribute information of a subscriber of a mobile phone as of the end of "August" in a provider of a mobile terminal communication service. The table B2 has the same items as the table B1. The table B2 has the item "date and time" as to when the attribute information is acquired, and it is understood that the value of the item "date and time" is "August" in all the records b21 and b22.

Figure 4:
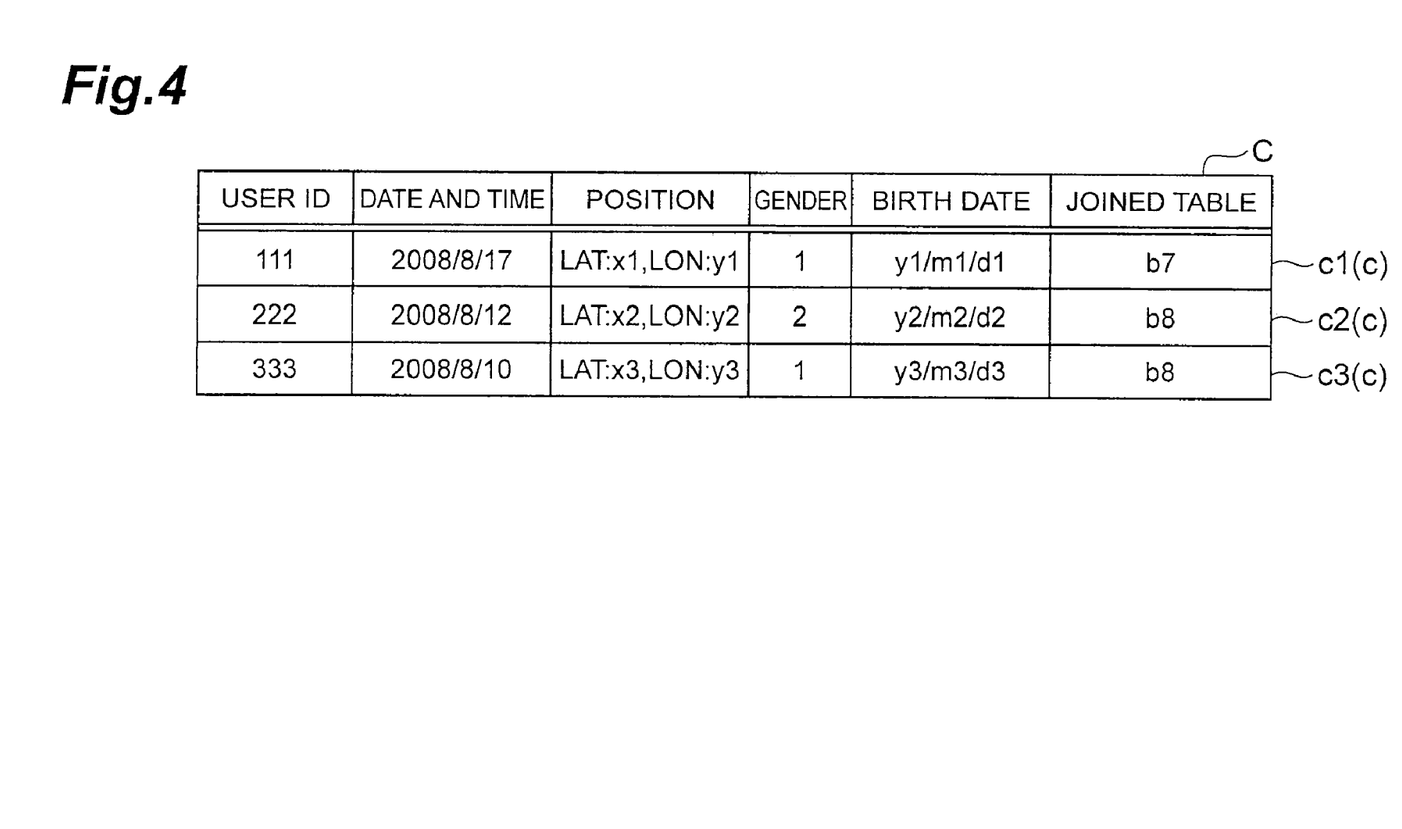
FIG. 4 is a diagram showing an example of a configuration of a table C stored in the table storage unit.

An example of the configuration of the table C is shown in FIG. 4. The table C is a table which stores a record c generated by joining any of the records b stored in the tables B1 and B2 with the record a in the table A. The table C has items "user ID", "date and time", "position", "gender", "birth date", and "the joined table". The item "the joined table" shows a table from which the joined record b is acquired, and has a value such as "b7 (table B1)", "b8 (table B2)".

In the following, each functional unit of the server 1 will be described in detail using FIG. 1.

The user request acquisition unit 10 is a unit that acquires a process request for data join from a user. A variety of specified matters concerning data join are included in the process request. The included information is, for example, "join the table A and the table B group for output to the table C", "select a record having a match in the item of user ID and being extracted from the table B group by a predetermined algorithm based on the item of date and time, and join the selected record with a record in the table A", "a predetermined kind of algorithm", and "output only the successfully joined record to the table C".

The table determination unit 11 is a unit that selects a record b to be joined with a record a stored in the table A, from the table B group. The details of processing carried out by the table determination unit 11 will be described later. The table determination unit 11 sends the record a acquired from the table A and the record b selected from the table B group to the data join unit 13.

The data read unit 12 is a unit that acquires a record with reference to the table A, the table B1 and the table B2 stored in the table storage unit 16. The data read unit 12 sends the acquired record to the table determination unit.

The data join unit 13 is a unit that acquires a record a and a record b from the table determination unit 11 and joins the record a with the record b to generate a record c. The data join unit 13 sends the record c to the data write unit 14.

The data write unit 14 is a unit that acquires a record c from the data join unit 13 and writes the acquired record c to the table C. When write of all the records is finished, the data write unit 14 sends a notification as such to the user result output unit 15.

The user result output unit 15 is a unit that acquires the notification that write of the records is finished, from the data write unit 14, and displays as such.

Figure 5:
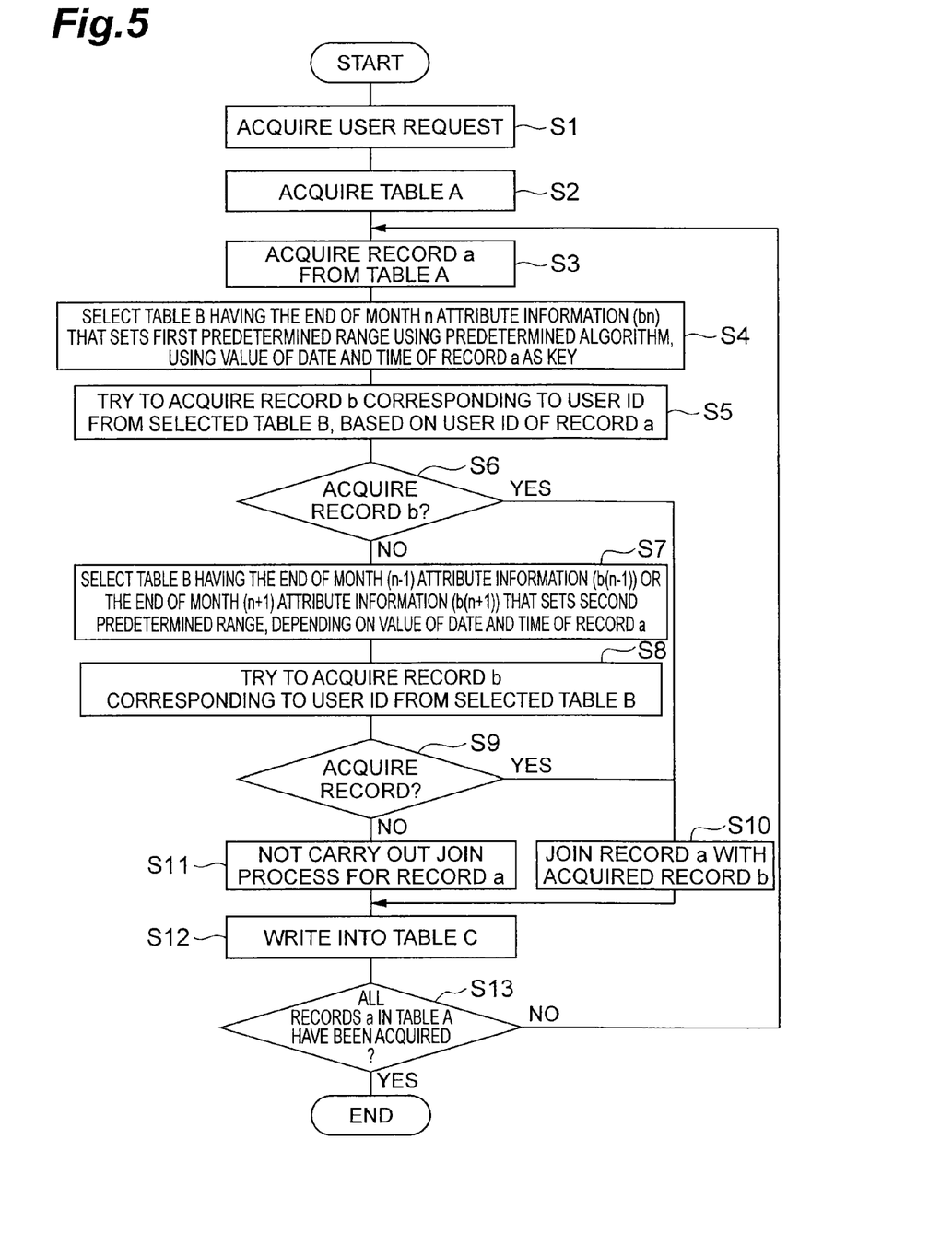
FIG. 5 is a flowchart showing a process content of a data join method carried out in the server.

Next, the operation of the server 1 in the data join method of the present embodiment will be described using FIG. 5. FIG. 5 is a flowchart showing a process content of data join performed in the server 1.

First, the user request acquisition unit 10 acquires a process request for data join from a user (S1). This process request includes, for example, information such as "select a record b having a match in the item "user ID" and being extracted by a predetermined algorithm based on the item concerning "date and time", from the table B group, and join the selected record b with a record a in the Table A". It is noted that, in the present embodiment, the item "user ID" corresponds to an identification item in the present invention, and the item "date and time" corresponds to a key item in the present invention.

The identification item may be an item in which a value not having a concept of range is stored or may be an item in which a value having a concept of range is stored. An example of the former is a case where the identification item is an item that stores a user ID, which is an identifier of a user, as a value. An example of the latter is a case where the identification item is an item that stores a network prefix of an identifier of an IP address, as a value. In the present embodiment, the following description is given assuming that the identification item is an item in which a value not having a concept of range is stored. The key item is an item in which a consecutive or discrete value can be assumed, and can involve the concept of range for its value.

Next, the data read unit 12 acquires the table A from the table storage unit 16 (S2). The table determination unit 11 then acquires a record a from the acquired table A (S3). Here, it is assumed that a record a1 is first acquired.

Then, the table determination unit 11 selects one of tables B from the table B group using a predetermined algorithm, using a value of the item "date and time" of the record a as a key (S4). The predetermined algorithm is described here. In the present embodiment, the following two kinds of algorithms exist.

The first algorithm: the end of the month n attribute information (bn) (record b) is joined with the positional information in which the acquired "date and time" is the 1st to 31st of the month n (record a).

The second algorithm: the end of the month n attribute information (bn) (record b) is joined with the positional information in which the acquired "date and time" is the 16th of the month n to the 15th of the month (n+1) (record a).

More specifically, according to the first algorithm, the range of the 1st to 31st of the month n is set based on the value (the month n) in the item "date and time" included in the record b, and if the value of "date and time" of the record a is included in this range, the record a and the record b are joined. According to the second algorithm, the range of the 16th of the month n to the 15th of the month (n+1) is set based on the value (the month n) in the item "date and time" included in the record b, and if the value of "date and time" of the record a is included in this range, the record a and the record b are joined. The period "the 1st to 31st of the month n" concerning the date and time in the first algorithm and the period "the 16th of the month n to the 15th of the month (n+1)" concerning the date and time in the second algorithm correspond to a first predetermined range in the present invention.

Here, assuming that the first algorithm is used, as the record a1 is selected in step S3 and the value of the item "date and time" of the record a1 is "2008/8/17", the table B2 having the end of August attribute information (b8) is selected (S4).

Next, the table determination unit 11 tries to acquire a record b having the value "111" in the item "user ID" from the table B2 based on the value "111" in the item "user ID" of the record a (S5). Then, the table determination unit 11 determines whether a record b is acquired (S6). If a record b can be acquired, the process procedure proceeds to step S10. If a record b cannot be acquired, the process procedure proceeds to step S7. Here, a record b having the value "111" of the "user ID" does not exist in the record B2 (see FIG. 3(c)), and the process procedure therefore proceeds to step S7.

In the present embodiment, since the "user ID" corresponding to the identification item of the present invention is an item not having the concept of range, the table determination unit 11 acquires a record b when the value of the item "user ID" in the record a agrees with the value of "user ID" in the record b. By contrast, when an item having the concept of range as illustrated as, for example, "IP address" different from "user ID" is used as the identification item of the present invention, if parts of "IP address" (for example, the higher-order portion) in a record a and a record b agree, the table determination unit 11 can acquire the record b. More specifically, the range of value of an IP address is set based on the IP address group in which the higher-order portions of the "IP address" of records b agree, and if the IP address of a record a falls within that range, the table determination unit 11 acquires the record b. In this manner, when the item having the concept of range is used as the identification item of the present invention, a predetermined range can be set based on the value of the item of a record b. A predetermined range set here corresponds to "predetermined identification range" in the present invention. In the present embodiment, it is still assumed that the table determination unit 11 performs a determination process for acquiring a record b using a "user ID" which is an item not having the concept of range. However, the determination process may be performed using an item having the concept of range as described above.

In step S7, the table determination unit 11 selects the table B having the end of the month (n−1) attribute information (b(n−1)) or the table B having the end of the month (n+1) attribute information (b (n+1)), depending on the value of the item "date and time" of the record a, through the data read unit 12 (S7). Here, the period "the 1st to 31st of the month (n−1)" set based on the end of the month (n−1) attribute information (b(n−1)) or the period "the 1st to 31st of the month (n+1)" set based on the end of the month (n+1) attribute information (b(n+1)) is set as the second predetermined range in the present invention.

Specifically, when the first algorithm is used, the table determination unit 11 selects the end of the month (n−1) attribute information (b(n−1)). This is an event in a case where a record b having the user ID "111" does not exist in the end of the month n attribute information (bn) because the user having the user ID "111" has already terminated a mobile terminal service as of the end of the month n. The period "the 1st to 31st of the month (n−1)" to be associated with the end of the (n−1) month attribute information (b(n−1)) corresponds to the second predetermined range set adjacent to the first predetermined range "the 1st to 31st of the month n" in the present invention.

On the other hand, when the second algorithm is used, if the value of the item "date and time" of a record a is "the 16th to the 31st of the month n", the table determination unit 11 selects the end of the (n−1) month attribute information (b(n−1)), and if the value of the item "date and time" of a record a is "the 1st of the month (n+1) to the 15th of the month (n+1), the table determination unit 11 selects the end of the month (n+1) attribute information (b(n+1)). The period "the 16th of the month (n−1) to the 15th of the month n" associated with the end of the month (n−1) attribute information (b(n−1)) and the period "the 16th of the month (n+1) to the 15th of the month (n+2)" associated with the end of the month (n+1) attribute information (b(n+1)) correspond to the second predetermined range set adjacent to the first predetermined range "the 16th of the month n to the 15th of the month (n+1)" in the present invention.

When the value of the item "date and time" of a record a is "the 16th of the month n to the 31st of the month n" and if a record b having the value of "user ID" of "111" does not exist, the user having the user ID "111" has already terminated a mobile phone terminal service as of the end of the month n. When the value of the item "date and time" of a record a is "the 1st of the month (n+1) to the 15th of the month (n+1)" and if a record b having the value of "user ID" of "111" does not exist, the user having the user ID "111" subscribed to a mobile terminal service at a point of time later than the end of the month n and prior to the 15th of the month (n+1).

As the first algorithm is used here, the table determination unit 11 selects the table B1 having the end of July attribute information (b7), through the data read unit 12 (S7).

Next, the table determination unit 11 tries to acquire a record b having the value of the item "user ID" of "111" from the table B selected in step S7 (S8). The table determination unit 11 then determines whether a record b is acquired (S9). If a record b can be acquired, the process procedure proceeds to step S10. If a record b cannot be acquired, the process procedure proceeds to step S11. Here, a record b11 having the value of "user ID" of "111" exists in the record B1 (see FIG. 3(b)), and the process procedure therefore proceeds to step S10.

In step S10, the table determination unit 11 sends the record a and the record b acquired in step S5 or step S8 to the data join unit 13. The data join unit 13 then joins the record a and the record b acquired from the table determination unit to generate a record c. On the other hand, when the process procedure proceeds to step S11, the data join unit 13 only acquires the record a and does not carry out the join process (S11). In the present embodiment, the process procedure proceeds to step S10, and the data join unit 13 acquires the record a1 and the record b11 and joins theses records.

Next, the data join unit 13 sends the generated record c to the data write unit 14, and the data write unit 14 then acquires the sent record c and writes the record c into the table C (S12). In the present embodiment, the data write unit 14 writes the record c1 into the table C (see FIG. 4). It is noted that only a record subjected to the join process may be written into the table C, or for a record not subjected to the join process, the record not joined yet may be written.

In the next step S13, it is determined whether all the records a in the table A have been acquired. If it is determined that they have been acquired, the process procedure ends. If it is not determined they have been acquired, the process procedure returns to step S3 (S13).

For example, the process content will be described briefly in a case where a record a2 is acquired in step S3 (see FIG. 3(a)) and the first algorithm is used in step S4. As the value of the item "date and time" of the record a2 is "2008/8/12", the table B2 having "the end of August attribute information (b8)" is selected in step S4. As the value of the item "user ID" of the record a2 is "222" and a record b21 having the item "user ID" of "222" exists in the table B2, in step S10, the record a2 and the record b21 are joined, and a record c2 is written into the table C (see FIG. 4).

For example, the process content will be described briefly in a case where a record a3 is acquired in step S3 (see FIG. 3(a)) and the second algorithm is used in step S4. As the value of the item "date and time" of the record a3 is "2008/8/10", the table B1 having "the end of July attribute information (b7)" is selected as the first predetermined range in step S4. As the value of the item "user ID" of the record a3 is "333" and a record b having the item "user ID" of "333" does not exist in the table B1, in step S7, the table B2 having "the end of August attribute information (b8)" is selected as the second predetermined range. Then, as a record b22 having the item "user ID" of "333" exists in the table B2, in step S10, the record a3 and the record b22 are joined, and a record c3 is written into the table C (see FIG. 4).

(Second Embodiment)

Figure 6:
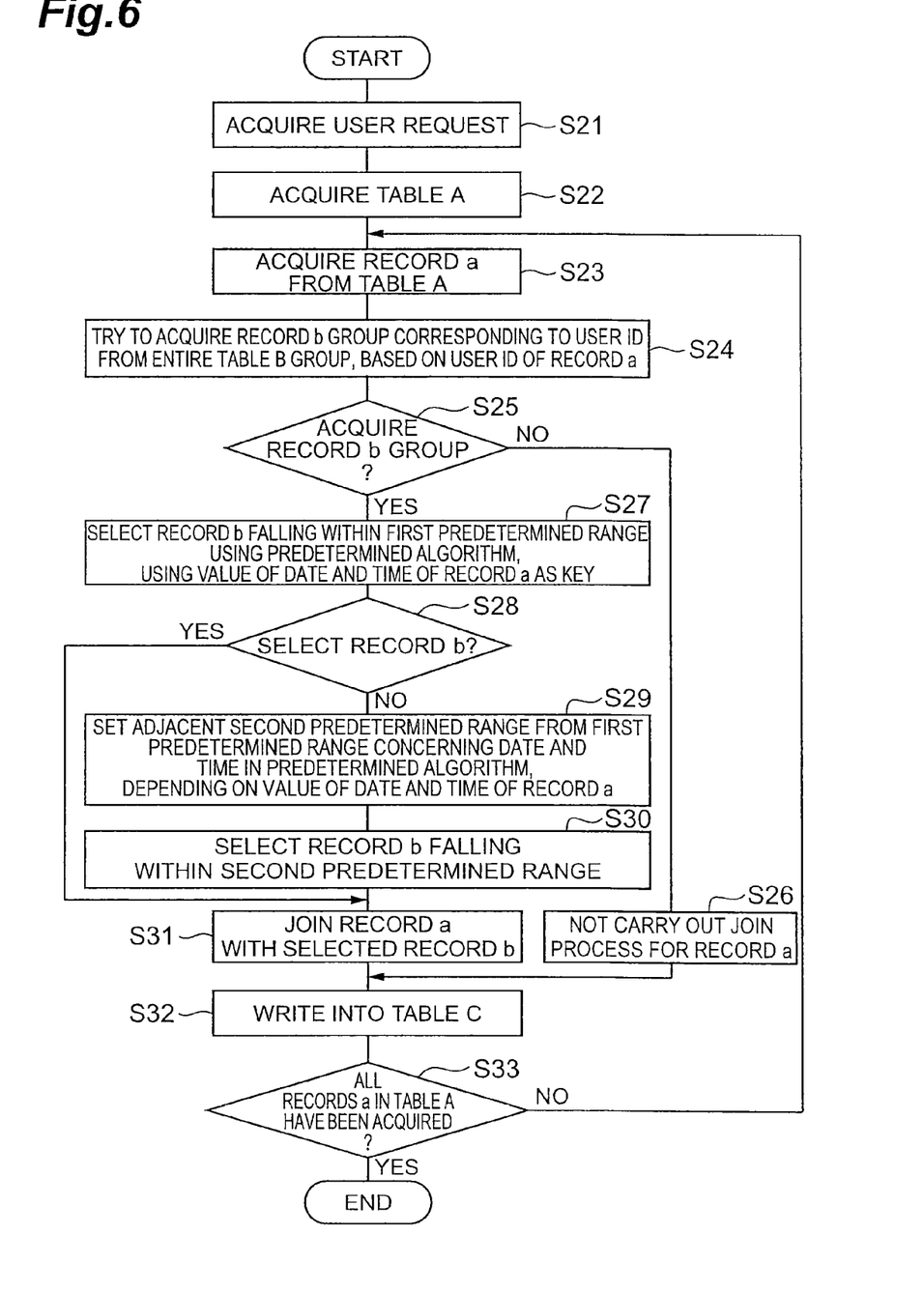
FIG. 6 is a flowchart showing a process content of a data join method according to another embodiment carried out in the server.

Next, the operation of the server 1 in the second embodiment will be described using FIG. 6. FIG. 6 is a flowchart showing a process content of the data join method performed in the server 1.

The process content in steps S21 to S23 is similar to the process in steps S1 to S3 in FIG. 5.

Next, the table determination unit 11 tries to acquire a record b group having the same value as the value of the user ID of the acquired record a from all the tables (here, the tables B1 and B2) belonging to the table B group, through the data read unit 12 (S24). For example, when a record a1 is acquired in step S23, a record b11 having the value of "user ID" of "111" is acquired.

The table determination unit 11 then determines whether a record b group is acquired in step S24 (S25). If a record b group can be acquired, the process procedure proceeds to step S27. If none of a record b group can be acquired, the process procedure proceeds to step S26. When the process procedure proceeds to step S26, the join process for the acquired record a is not carried out. For example, when the record b11 is acquired in step S24, the process procedure proceeds to step S27.

Next, the table determination unit 11 selects a record b that falls within the first predetermined range from the record b group, using the predetermined algorithm, using the value of "date and time" of the record a as a key (S27). For example, when the record b11 is acquired in step S24 and the first algorithm is used, the value "2008/8/17" of the item "date and time" included in the record a does not fall within the first predetermined range "the 1st to 31st of July" set based on the value "July" in the item "date and time" of the record b11. Therefore, the record b11 is not selected. In addition, in this embodiment, the item "date and time" corresponds to the key item in the present invention, and the item "user ID" corresponds to the "identification item" in the present invention.

In the next step S28, the table determination unit 11 determines whether a record b is selected in step S27. If a record b is selected, the process procedure proceeds to step S31. If a record b is not selected, the process procedure proceeds to step S29. For example, when the record b11 is not selected in step S27, the process procedure proceeds to step S29.

In step S29, the table determination unit 11 sets the adjacent, second predetermined range from the first predetermined range set by the predetermined algorithm, as the range to be extracted, depending on the value of the item "date and time" of the record a.

Specifically, when the first algorithm is used, if the first predetermined range is "the 1st to 31st of the month n", the second predetermined range is set as "the 1st to 31st of the month (n+1)". Such setting is made in a case where a record b having the user ID "111" does not exist in the end of the month n attribute information (bn) since the user having the user ID "111" has already terminated a mobile terminal service as of the end of the month n.

On the other hand, when the second algorithm is used, if the first predetermined range is "the 16th of the month n to the 15th of the month (n+1)" and the value of the item "date and time" of the record a is "the 16th of the month (n+1) to the 31st of the month (n+1)", the second predetermined range is set as "the 16th of the month (n+1) to the 15th of the month (n+2)". Such setting is made in a case where the user having the user ID "111" still had a mobile terminal service contract as of the end of the month n and terminated the contract by the end of the month (n+1). If the value of the item "date and time" of the record a is "the 1st of the month n to the 15th of the month n", the second predetermined range is set as "the 16th of the month (n−1) to the 15th of the month n". Such setting is made in a case where the user having the user ID "111" has not yet subscribed to a mobile terminal service as of the end of the month (n−1) and subscribed to the service by the end of the month n.

Here, the table determination unit 11 sets the second predetermined range as "the 1st to 31st of August" based on the first predetermined range "the 1st to 31st of July".

Next, the table determination unit 11 selects a record b that matches the predetermined algorithm from the record b group acquired in step S24, based on the second predetermined range (S30). In the present embodiment, the table determination unit 11 selects the record b11 as a record to be joined, since the value "2008/8/17" in the item "date and time" of the record a falls within the second predetermined range "the 1st to 31st of August".

Next, in step S31, the table determination unit 11 sends the record a and the record b selected in step S27 or step S30 to the data join unit 13. The data join unit 13 then joins the record a and record b acquired by the table determination unit to generate a record c (S31). On the other hand, when the process procedure proceeds to step S26, the data join unit 13 acquires only the record a and does not carry out the join process (S26). For example, when the record b11 is selected in step S30, the data join unit 13 acquires the record a1 and the record b11 and joins these records.

Next, the data join unit 13 sends the generated record c to the data write unit 14, and the data write unit 14 then acquires the sent record c and writes the record c into the table C (S32). Here, the data write unit 14 writes the record c1 into the table C (see FIG. 4).

The process content carried out in step S33 is similar to that in step S13 in FIG. 5. The process carried out in steps S23 to S33 may be repeatedly carried out as shown in FIG. 6 or may be performed concurrently for all the records a stored in the table A. When the process is concurrently performed, each process may be assigned to and carried out in a plurality of server apparatuses that can communicate with each other via a network.

(Third Embodiment)

In the example explained using FIG. 6, selection of a record b is made using the value of the item "date and time" as a key item. However, selection of a record b may be made by using a plurality of other items included in a record a and a record b as key items, and carrying out the process in steps S27 to S30 for each item.

Specifically, when a record a and a record b have a plurality of (n) items, the process in steps S27 to S30 is repeated n times for each item. When the values of a plurality of items included in a record a fall within the respective first predetermined ranges set based on the values of a plurality of items included in the record b group acquired in step S24, the record b is selected as a record to be joined with the record a. Even when the values of the items included in a record a do not fall within the respective first predetermined ranges set based on the values of a plurality of items included in a record b, if they fall within the respective second predetermined ranges set adjacent to the first predetermined ranges, the record b is selected as a record to be joined with the record a. In other words, when the values of a plurality of items included in a record a fall within the respective first predetermined ranges set based on the values of a plurality of items included in a record b or the respective second predetermined ranges set adjacent to the first predetermined ranges, the record b is selected as a record to be joined with the record a. In this case, the item "date and time" and a plurality of items as described above correspond to a plurality of key items in the present invention.

In this case, even when a record a and a record b have a plurality of items, if each item in a record a falls within a predetermined range set for each item in a record b, the record b is selected as a record to be joined with the record a. Therefore, the success rate of data join can be improved while the accuracy of join of a record a and a record b to be joined is maintained.

Next, the operation effects of the data join system and the data join method as described above will be described. In the data join system and the data join method in the present embodiment, in joining a record a with a record b, when a user ID is matched and, in addition, when the table determination unit 11 determines that the value of the item "date and time" of a record a falls within the first predetermined range set based on the value of the item "date and time" of a record b, the record b is joined with the record a by the data join unit 13, thereby improving the success rate of data join. In addition, the join accuracy can be improved since the first predetermined range is set by the table determination unit 11 based on the value of the item "date and time" included in the record b.

Even when the value of the item "date and time" of a record a does not fall within the first predetermined range concerning the value of the item "date and time" of a record b, if it falls within a second predetermined range adjacent to the first predetermined range, the record b is selected by the table determination unit 11 as a record to be joined with the record a, thereby improving the success rate of data join.

Furthermore, even when a record a and a record b are data having a plurality of items, if each item of the record a falls within the first or second predetermined range set for each item in the record b, the table determination unit 11 selects the record b as data to be joined with the record a. Therefore, the success rate of data join can be improved while the accuracy of join of the record b and the record a to be joined is improved.

INDUSTRIAL APPLICABILITY

The present invention can improve the success rate of data join while improving the accuracy of join of data to be joined.

The invention claimed is:
1. A data join system for joining join source data including an identification item and a key item with selected join target data which is one of join target data selected from a join target data group having a plurality of join target data including an identification item and a key item, the data join system comprising:
a join source data storage section configured to store the join source data;
a join target data storage section configured to store the join target data group;
a data determination section configured to select join target data as the selected join target data if a value of the identification item included in one of join source data stored in the join source data storage section agrees with a value of the identification item included in the join target data stored in the join target data storage section or falls within a predetermined identification range set based on the value of the identification item included in the join target data, and if a value of the key item included in the join source data falls within a first predetermined range set based on a value of the key item included in the join target data;
a data join section configured to join the selected join target data selected by the data determination section with the join source data to generate composite data;
a composite data storage section configured to store the composite data; and
a data write section configured to store the composite data generated by the data join section into the composite data storage section, wherein
the predetermined identification range is a finite range including a value of the identification item included in the join target data,
the first predetermined range is a finite range including a value of the key item included in the join target data, and
when the selected join target data cannot be selected based on the first predetermined range, the data determination section selects join target data as the selected join target data if a value of the identification item included in the one of join source data agrees with a value of the identification item included in the join target data stored in the join target data storage section or falls within a predetermined range set based on the value of the identification item included in the join target data, and if a value of the key item included in the join source data falls within a second predetermined range set adjacent to the first predetermined range.

2. The data join system according to claim 1, wherein the data determination section extracts, as extracted join target data, join target data in which a value of the identification item included in the join target data agrees with a value of the identification item included in the join source data or a value of the identification item included in the join source data falls within a predetermined identification range set based on the value of the identification item included in the join target data, from a plurality of the join target data stored in the join target data storage section,
if a value of the key item included in the join source data falls within the first predetermined range set based on a value of the key item included in the extracted join target data, the data determination section selects the extracted join target data as the selected join target data, and
when a value of the key item included in the join source data does not fall within the first predetermined range set based on a value of the key item included in the extracted join target data, the data determination section selects the extracted join target data as the selected join target data if the value of the key item included in the join source data falls within a second predetermined range set adjacent to the first predetermined range.

3. The data join system according to claim 2, wherein the join source data and the join target data include a plurality of key items, and if values of a plurality of key items included in the join source data fall within the respective first predetermined ranges set based on values of a plurality of key items included in the extracted join target data or the respective second predetermined ranges set adjacent to the first predetermined ranges, the data determination section selects the extracted join target data as the selected join target data.

4. The data join system according to claim 1, wherein the join target data group includes a plurality of tables, and each of the tables has a plurality of join target data having values of the same key item.

5. The data join system according to claim 1, wherein the data determination section extracts, as extracted join target data, join target data in which a value of the key item included in the join source data falls within the first predetermined range, from a plurality of the join target data stored in the join target data storage section, if a value of the identification item included in the extracted join target data agrees with a value of the identification item included in the join source data or if a value of the identification item included in the join source data falls within a predetermined identification range set based on the value of the identification item included in the extracted join target data, the data determination section selects the extracted join target data as the selected join target data, and when a value of the identification item included in the extracted join target data does not agree with a value of the identification item included in the join source data and when a value of the identification item included in the join source data does not fall within a predetermined identification range set based on the value of the identification item included in the extracted join target data, the data determination section extracts again, as the extracted join target data, another join target data having such a value that sets a second predetermined range adjacent to the first predetermined range as the key item, from the join target data storage section, and selects, as selected join target data, the extracted join target data in which a value of the identification item agrees with a value of the identification item included in the join source data or falls within a predetermined identification range set based on the value of the identification item included in the extracted join target data, from the extracted join target data that is extracted again.

6. The data join system according to claim 5, wherein the join target data group includes a plurality of tables for each key item, each of the tables having a plurality of join target data having values of the same key item, if a value of the key item included in the join source data falls within the first predetermined range set based on a value of the key item of the table included in the join target data group, the data determination section extracts the table as a first table, if a value of the identification item of the join target data in the extracted first table agrees with a value of the identification item included in the join source data, or if a value of the identification item included in the join source data falls within a predetermined identification range set based on the value of the identification item included in the join target data, the data determination section selects the join target data as the selected join target data, when the selected join target data cannot be selected from the first table, the data determination section extracts, as a second table, a table having such a value that sets a second predetermined range adjacent to the first predetermined range as the key item, from the join target data group, and if a value of the identification item of the join target data in the extracted second table agrees with a value of the identification item included in the join source data, or if a value of the identification item included in the join source data falls within a predetermined identification range set based on the value of the identification item included in the join target data, the data determination section selects the join target data as the selected join target data.

7. The data join system according to claim 1, wherein the key item is an item concerning a date and time, and the first and second predetermined ranges each are a predetermined period including a date and time of a value of the key item.

8. A data join method for joining join source data including an identification item and a key item with selected join target data which is one of join target data selected from a join target data group having a plurality of join target data including an identification item and a key item, the data join method comprising:

a data determination step of selecting join target data as the selected join target data if a value of the identification item included in one of join source data agrees with a value of the identification item included in the join target data or falls within a predetermined identification range set based on the value of the identification item included in the join target data, and if a value of the key item included in the join source data falls within a first predetermined range set based on a value of the key item included in the join target data;

a data join step of joining the selected join target data selected in the data determination step with the join source data to generate composite data; and a data write step of storing the composite data generated in the data join step into composite data storage section to configured to store the composite data, wherein the predetermined identification range is a finite range including a value of the identification item included in the join target data, the first predetermined range is a finite range including a value of the key item included in the join target data, and in the data determination step, when the selected join target data cannot be selected based on the first predetermined range, the join target data is selected as the selected join target data, if a value of the identification item included in the one of join source data agrees with a value of the identification item included in the join target data or falls within a predetermined range set based on the value of the identification item included in the join target data, and if a value of the key item included in the join source data falls within a second predetermined range set adjacent to the first predetermined range.

9. The data join method according to claim 8, wherein the join target data group includes a plurality of tables for each key item, each of the tables having a plurality of join target data having values of the same key item, in the data determination step, if a value of the key item included in the join source data falls within the first predetermined range set based on a value of the key item of the table included in the join target data group, the table is extracted as a first table, if a value of the identification item of the join target data in the extracted first table agrees with a value of the identification item included in the join source data, or if a value of the identification item included in the join source data falls within a predetermined identification range set based on the value of the identification item included in the join target data, the join target data is selected as the selected join target data, when the selected join target data cannot be selected from the first table, a table having such a value that sets a second predetermined range adjacent to the first predetermined range as the key item is extracted as a second table from the join target data group, and if a value of the identification item of the join target data in the extracted second table agrees with a value of the identification item included in the join source data, or if a value of the identification item included in the join source data falls within a predetermined identification range set based on the value of the identification item included in the join target data, the join target data is selected as the selected join target data.

* * * * *